United States Patent [19]

Drexler

[11] Patent Number: 4,680,458

[45] Date of Patent: Jul. 14, 1987

[54] LASER RECORDING AND STORAGE MEDIUM

[75] Inventor: Jerome Drexler, Los Altos Hills, Calif.

[73] Assignee: Drexler Technology Corporation, Mountain View, Calif.

[21] Appl. No.: 774,563

[22] Filed: Sep. 10, 1985

Related U.S. Application Data

[63] Continuation-in-part of Ser. No. 673,573, Nov. 21, 1984, Pat. No. 4,542,288, which is a continuation-in-part of Ser. No. 566,966, Dec. 29, 1983, Pat. No. 4,500,777, which is a continuation-in-part of Ser. No. 492,691, May 11, 1983, abandoned, which is a continuation-in-part of Ser. No. 238,833, Feb. 27, 1981, abandoned.

[51] Int. Cl.⁴ .................................................. G06K 19/00
[52] U.S. Cl. .................................... 235/487; 235/454; 430/10; 346/76 L; 350/361; 365/106; 428/209; 427/7
[58] Field of Search .............. 235/440, 454, 456, 468, 235/470, 487, 493; 350/361; 346/76 L; 430/10, 13; 365/106; 428/209; 427/7, 145

[56] References Cited

U.S. PATENT DOCUMENTS

| | | | |
|---|---|---|---|
| 3,873,813 | 3/1975 | Lahr et al. | 235/61.12 N |
| 4,014,602 | 3/1977 | Ruell | 350/3.61 |
| 4,171,864 | 10/1979 | Jung et al. | 350/3.61 |
| 4,190,843 | 2/1980 | Spong | 346/1.1 |
| 4,197,986 | 4/1980 | Nagata | 235/379 |
| 4,202,491 | 5/1980 | Suzuki | 235/491 |
| 4,209,804 | 6/1980 | Dil | 358/128.5 |
| 4,224,666 | 9/1980 | Giraud | 364/200 |
| 4,300,143 | 11/1981 | Bell et al. | 346/135.1 |
| 4,304,990 | 12/1981 | Atalla | 235/380 |
| 4,305,081 | 12/1981 | Spong | 346/135.1 |
| 4,313,188 | 1/1982 | Bartolini et al. | 369/109 |
| 4,314,260 | 2/1982 | Drexler | 346/76 L |
| 4,345,261 | 8/1982 | Wilkinson | 346/76 L |
| 4,357,616 | 11/1982 | Terao et al. | 346/135.1 |
| 4,465,767 | 8/1984 | Oba et al. | 346/76 L |
| 4,544,181 | 10/1985 | Maurer et al. | 346/76 L |

Primary Examiner—David L. Trafton

[57] ABSTRACT

An optical data recording and information storage medium which uses an exposed and developed photosensitive medium with a transparent substrate to store prerecorded data spots. A reflective laser recording metal layer is vapor deposited on the processed photosensitive medium so as to create laser recordable areas adjacent to the prerecorded data. The entire assembly is mounted on a base which may be transparent. A laser is used to write data spots on the thin metal layer. Both the prerecorded data spots and the laser written data spots are read by observing optical contrast with respect to the surrounding field.

11 Claims, 4 Drawing Figures

LASER RECORDING AND STORAGE MEDIUM

CROSS REFERENCE TO RELATED APPLICATION

This application is a continuation-in-part of prior application Ser. No. 673,573, filed Nov. 21, 1984, now U.S. Pat. No. 4,542,288 granted Sept. 17, 1985, which was a continuation-in-part of Ser. No. 566,966, filed Dec. 29, 1983, now U.S. Pat. No. 4,500,777, which was a continuation-in-part of prior application Ser. No. 492,691, filed May 11, 1983, now abandoned, which was a continuation-in-part of prior application Ser. No. 238,833, filed Feb. 27, 1981, now abandoned.

TECHNICAL FIELD

The invention relates to optical information storage.

BACKGROUND ART

Dil, in U.S. Pat. No. 4,209,804, teaches a reflective information recording structure which contains prepressed V-shaped grooves in which data may be recorded by local melting of the reflective metal coating by a laser. The data on the media is read by means of optical phase shift effects. Since the preformed grooves are at an optical phase depth of 95° to 140°, the reading laser must be of the precise wavelength corresponding to the groove depth. The information area has a width of approximately 0.6 microns, so a thick protective substrate, usually 1200 microns deep is used to ensure that one-micron surface dust particles are out-of-focus for the read beam.

Such thick protective materials cannot be used for wallet cards which have a total thickness of only 800 microns under ISO (International Standards Organization) standards and further it would be uncomfortable to carry a rigid card in trouser pockets or wallets. Also, it is difficult to bond a phase sensitive recording/reading surface to a protective laminating material with an adhesive without introducing a varying phase shift across the surface. It is also impractical to melt large holes since a large lip would be formed around the hole causing a great distortion of the phase shift. Edge transition of the hole is the phase shift which is measured, and since the height of the lip is directly proportional to the square root of the hole diameter, phase shift reading is only practical for small holes. For example, a 25 micron diameter hole creates a lip with one-micron height, which is much larger than the wavelength of the reading beam. Thus for large holes and bonded protective materials it is desirable to have a recording/reading structure that does not rely on phase shifts.

Lahr in U.S. Pat. No. 3,873,813 teaches a debit card in which use is indicated by alteration of a spot of heat sensitive coating in a selected area thereby permanently changing the reflective characteristics of that area. A reflective heat sensitive material becomes transparent on heating, thereby exposing an underlying strip of black paper which then absorbs the light energy. Recording requires exposure to a high intensity light beam for 0.7 second to raise the temperature of the material to 175° F. and an additional 5 milliseconds above 175° F. This type of credit card system permits recording of less than two data bits per second. Because of the retained, diffused liquid, the sizes of the data spots are large and difficult to regulate. This card requires a blue read beam, therefore scratches and surface dust will cause a large number of data errors unless very large data spots are used that reduce capacity to under 10,000 bits. While this data capacity is satisfactory for some debit and credit cards, it is unsuitable for detailed recording of financial, insurance, medical and personal records. Also, the recording rate of less than two bits per second would make it unacceptable for use in most applications. Another disadvantage of this card is that all of the data is destroyed if its temperature reaches 175° C., for example on the dashboard of a car or if passed through a household washer and dryer.

Nagata in U.S. Pat. No. 4,197,986, Girard in U.S. Pat. No. 4,224,666 and Atalla in U.S. Pat. No. 4,304,990 teach updating of data cards. Nagata teaches the updating of maximum limits and balance on a card in which the complete data file is in an auxiliary memory circuit such as a magnetic disc or drum. A sales slip containing the transaction is recorded separately from the card. Giraud teaches a data-processing machine-access card containing an integrated circuit chip with a memory bank. The memory stores predetermined items of confidential data intended to authorize or prevent access to the machine. Only the balance is updated.

Atalla teaches a card in which only the balance is recorded and updated. This card can only be used where the transaction system is connected to a central computer. None of these cards has the memory storage capacity needed to accumulate records of past transactions.

Various recording media have been developed for use on a rotating disc format. Because the disc is spinning rapidly, short laser pulse times (on the order of 500 nanoseconds) are necessary to confine the heating to small spots. The media have been developed to increase the sensitivity to the beam by varying the parameter of media absorptivity. Spong in U.S. Pat. Nos. 4,190,843 and 4,305,081 puts an absorptive dye layer over a reflective aluminum layer. Spots are recorded by ablation of the dye layer exposing the underlying reflective layer. Bell in U.S. Pat. No. 4,300,143, teaches a similar technique. Bartolini in U.S. Pat. No. 4,313,188 adds a protective layer between the dye layer and the reflective layer. Wilkinson in U.S. Pat. No. 4,345,261 uses a light absorptive silica dielectric layer in place of the dye layer. Terao, et al. in U.S. Pat. No. 4,357,616 teaches an inorganic absorptive layer over an organic recording film layer. Holes are formed in the film layer by heat generated in the absorptive layer. Suzuki in U.S. Pat. No. 4,202,491 uses a fluorescent ink layer on which data spots emit infrared radiation. Improved sensitivity is obtained in these media at the expense of extra layers which increase complexity and cost. This increased sensitivity is not necessary for a card format.

DISCLOSURE OF INVENTION

It is an object of the invention to devise a recording medium having both prerecorded read only data spots and formatting patterns and laser recordable areas. It is also the object of the invention to devise a card structure for supporting such a medium in which the reflective laser recordable surface is protected from abrasion without interfering with the optical characteristics of the recording surface. It is also the object of the invention to devise a card structure for supporting such a medium in which surface dirt would be in a different focal plane than that of the recording surface without application of a protective coating directly to the reflective recording surface.

It is another object of the present invention to devise a wallet-size plastic data card containing a laser recordable strip for sequential recording of transaction data on the data card with a laser where the data on the card optically contrasts with the surrounding unrecorded field.

It is a further object of the invention to devise a wallet-size card, containing a laser recordable strip, that meets the ISO dimensions for plastic credit cards, has a capacity of at least 250,000 bits, can record data at thousands of bits per second and contains prerecorded information on the strip, and would not degrade at temperatures of 122° F. or higher.

These objects were met with a new information storage and recording medium mounted on a wallet-size sealed plastic card only 800 microns thick containing a laser recordable strip using data spots up to 25 microns in size to minimize reading errors. The medium is a strip which contains prerecorded information on the strip such as read only memory or reference position information and has a thin reflective recording layer for user-recorded laser written data. The data system of the present invention relies on reading of optical contrast ratios. The card is formed by first prerecording information by exposing with a pattern through a mask or otherwise and developing a strip of photosensitive film, vacuum depositing a laser record-able, thin reflective metal layer on top of the prerecorded information, adhering the strip on the card base with the reflective side down, bonding a protective, transparent material over the film substrate, the substrate being on the film strip's upper surface, and then recording transaction information through the protective material and the transparent substrate onto the underlying reflective surface by means of a laser.

One of the chief advantages of the present invention is the high information capacity of laser recording media strips. Typically, high resolution laser recording materials record spots of altered reflectivity optically contrasting with the surrounding reflective field and having dimensions less than 25 microns. A high capacity laser recording material strip enables a card to carry the equivalent of scores of pages of text, more than ample for most applications. The transaction card of the present invention is suitable for accumulating sequentially recorded data involving financial transactions, insurance transactions, medical information and events, and personal information and identification.

BEST MODE FOR CARRYING OUT THE INVENTION

Figure 1:
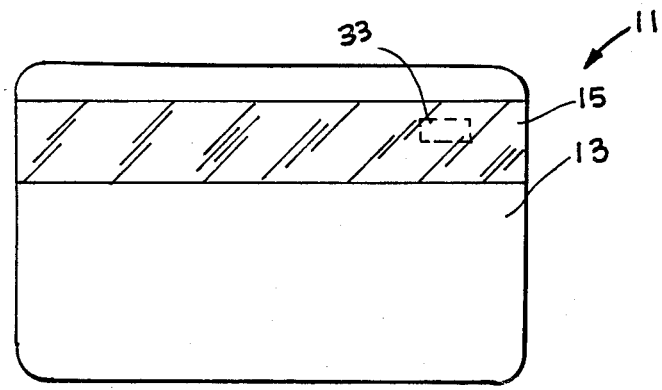
FIG. 1 is a plan view of one side of a data card in accord with the present invention.
Figure 2:
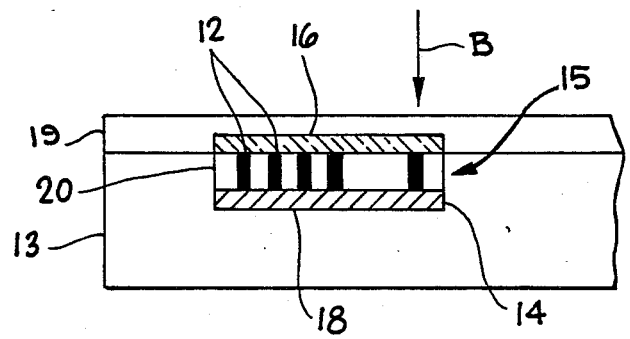
FIG. 2 is a partial side sectional view taken along lines 2—2 in FIG. 1.

With reference to FIGS. 1 and 2, a data card 11 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 13 is a dielectric, usually a plastic material such as polyvinyl chloride or similar material. Polycarbonate plastic is preferred. The base may be of a transmissive material to allow reading of data by either reflected or transmitted light. The surface finish of the base should have low specular reflectivity, preferably less than 10%. Base 13 carries strip 15. The strip is about 15 millimeters wide and extends the length of the card. Alternatively, the strip may have other sizes and orientations. The strip is relatively thin, approximately 100–500 microns, although this is not critical. The strip may be applied to the card by any convenient method which achieves flatness. The strip is adhered to the card with an adhesive and covered by a transparent laminating sheet 19 which serves to keep strip 15 flat, as well as protecting the strip from dust and scratches. Layer 19 is a thin, transparent plastic sheet laminating material or a coating, such as a transparent lacquer. The material is preferably made of polycarbonate plastic.

The opposite side of base 13 may have user identification indicia embossed on the surface of the card. Other indicia such as card expiration data, card number and the like may be optionally provided.

Strip 15 is formed from high resolution photographic film. Information is prerecorded on the light sensitive emulsion by photolithography techniques such as those shown in U.S. Pat. No. 4,304,848, assigned to the assignee of the present invention. After exposure and development, the prerecorded information appears as light absorptive black spots 12 in the emulsion. A thin reflective metal layer 14 is then vacuum-deposited in the usual way on top of the emulsion side of the film. Thickess of this layer is not as important as uniformity, particularly as to optical characteristics. To obtain uniformity the material is moved during vacuum deposition. When viewed through the transparent substrate the prerecorded spots are black against the reflective metal layer 14, forming a reflective laser recordable background distal to the transparent substrate. The prerecorded data spots may be grouped in one area of the strip, forming a read-only memory portion, or dispersed over the reflective recording area, forming servo tracks, timing marks, program instructions and related functions.

The outer surface 18 of the metal layer 14 on strip 15 is adhered to the card base 13 with an adhesive. Recording and reading are accomplished in the direction as shown by arrow B through the transparent layer 19 and strip on top of the inside surface 20 of the metal layer. There is no optical path interference by adhesive material. As shown in FIG. 2, both surfaces of the metal layer are protected from abrasion, dirt, and air oxidation. The reflective metal layer is preferably capable of being recorded on with a semiconductor laser, such as a low melting temperature reflective material with below average thermal conductivity. Tellurium and other metals such as Sn, In, and Bi, and their alloys, with high reflectivity and low melting point are suitable. Thin layers of higher melting temperature metals, such as aluminum and chromium can also be used but they require higher laser powers for recording. Methods for vapor depositing uniform, reflective, thin metal layers are well known.

In the configuration shown in FIG. 2, the prerecorded data spots are nearly in the same plane as the laser recorded data spots. This is desirable so that all data spots are in a common focal plane. However, this is not essential if the optical system is capable of resolving data spots in two planes. In this situation the emulsion layer need not be adjacent to the thin metal layer but could be spaced therefrom by the substrate of the film medium.

The metal which is selected should be compatible with the laser which is used for writing on it. Some metals are more sensitive than others at certain wavelengths. Good sensitivity to infrared light is preferred because infrared is affected least by scratches and dirt on the transparent laminating sheet. The selected recording metal should have a favorable signal-to-noise ratio and form high contrast data bits with the read/write system with which it is used. The metal layer should not lose data when subjected to temperatures of about 122° F. or 50° C. for long periods. The metal layer should also be capable of recording at speeds of at least several thousand bits/sec. This generally precludes the use of metals that require long heating times which may permit recording of only a few bits/sec. A large number of highly reflective laser recording materials have been used for optical data disk applications. Data is recorded by forming spots in the surrounding field of the reflective layer itself, thereby altering the reflectivity in the data spot. Data is read by detecting the optical reflective contrast between the surrounding reflective field of unrecorded areas and the prerecorded black spots and laser postrecorded spots on the metal layer. Spot reflectivity of less than half the reflectivity of the surrounding field produces a contrast ratio of at least two to one, which is sufficient conetrast for reading. Greater contrast is preferred. Reflectivity of th strip field of about 50% is preferred with reflectivity of a spot in the reflective field being less than 10%, thus creating a contrast ratio of greater than five to one.

Figure 3:
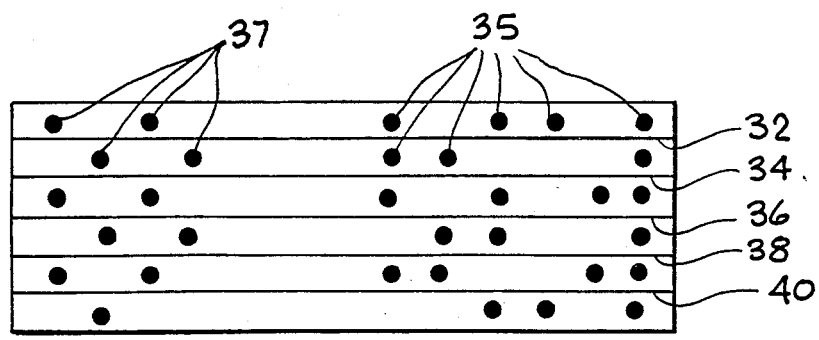
FIG. 3 is a detail of laser writing on a portion of the laser recording strip illustrated by dashed lines in FIG. 1.

With reference to FIG. 3, a magnified view of prerecorded information and laser writing on segment 33 of strip 15 of FIG. 1 may be seen. A group of prerecorded spots 37 has been recorded on the left hand side of the segment. The laser recorded spots 35 are recorded on the right side of the segment in a path and have generally similar dimensions. The spots are generally circular or oval in shape. The spots lie between imaginary lengthwise lines 32, 34, 36, 38, 40 and are laterally aligned as well as aligned in the lengthwise direction of the card. The spots 37 have similar dimensions to the spots 35. The spots are read by scanning the card in the appropriate direction. The prerecorded spots 37 may be grouped in one area of the strip as a read only memory without any laser recorded data or blended with user data. The spacing between spots is not critical, except that the optics of the readback system should be able to easily distinguish between spots.

Presently, in optical disk technology, tracks which are separated by only a few microns may be resolved. The spacing and pattern of the spots along each path is selected for easy decoding. For example, oval spots of the type shown can be clustered and spaced in accord with self-clocking bar codes. If variations in the dimensions of a spot are required, such dimensions can be achieved by clustering spots, such as the double spot 44. Such variations are used in the ETAB bar code which is described in U.S. Pat. No. 4,245,152. While the American Banker's Association has not yet adopted any particular code, the strip material is such that many machine and eye readable codes can be accommodated.

Some optical codes such as the Universal Product Code are both machine and eye readable. Such codes could also be accommodated, although a great deal more laser writing would be required than with circular or oval spots, and a much lower information density would be achieved. The spots illustrated in FIG. 3 typically have recommended sizes of approximately 5 microns by 20 microns, or 2 microns by 8 microns or circular spots 3 microns to 10 microns in diameter. Generally, the smallest dimension of a spot should be less than 50 microns. In the preferred embodiment the largest dimension would also be less than 50 microns. Of course, to offset lower densities from larger spots, the size of the strip 15 could be expanded to the point where it covers a large extent of the card. In FIG. 1, the strip 15 could completely cover a single side of the card. A minimum information capacity of 250,000 bits is indicated and a storage capacity of over one million bits is preferable. The size of prerecorded data spots is approximately the same size as laser written spots.

Figure 4:
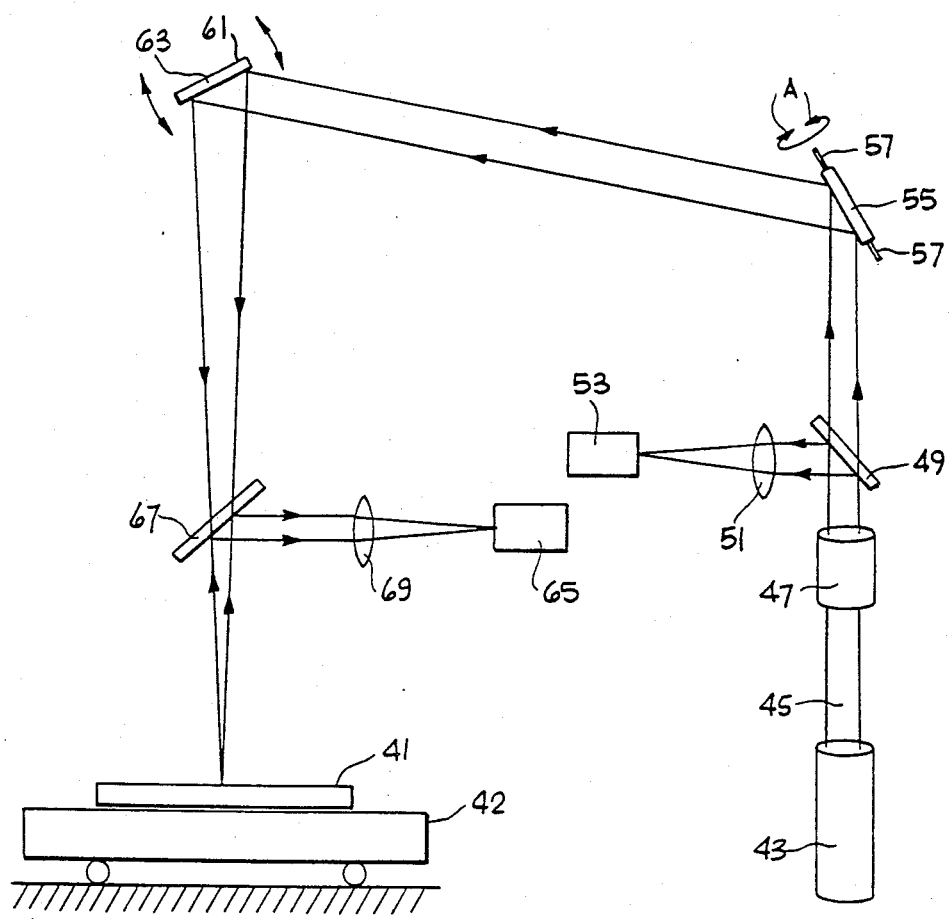
FIG. 4 is a plan view of an apparatus for reading and writing on the optical recording media strip illustrated in FIG. 1.

In FIG. 4, a side view of the lengthwise dimension of a card 41 is shown. The card is usually received in a movable holder 42 which brings the card into the beam trajectory. A laser light source 43, preferably a pulsed semiconductor laser of near infrared wavelength emits a beam 45 which passes through collimating and focussing optics 47. The beam is sampled by a beam splitter 49 which transmits a portion of the beam through a focusing lens 51 to a photodetector 53. The detector 53 confirms laser writing and is not essential. The beam is then directed to a first servo controlled mirror 55 which is mounted for rotation along the axis 57 in the direction indicated by the arrows A. The purpose of the mirror 55 is to find the lateral edges of the laser recording material in a coarse mode of operation and then in a fine mode of operation identify data paths which exist predetermined distances from the edges.

From mirror 55, the beam is directed toward mirror 61. This mirror is mounted for rotation at pivot 63. The purpose of mirror 55 is for fine control of motion of the beam along the length of the card. Coarse control of the lengthwise position of the card relative to the beam is achieved by motion of movable holder 42. The position of the holder may be established by a linear motor adjusted by a closed loop position servo system of the type used in magnetic disk drives. Prerecorded positioning marks can be used as a reference for the laser recording system to record or read data at particular locations. Each of the various industries, that is, financial, insurance, medical, and personal, has formats specific to its particular needs. Reference position information may be prerecorded on the card so that position error signals may be generated and used as feedback in motor control. Upon reading one data path, the mirror 55 is slightly rotated. The motor moves holder 41 lengthwise so that the path can be read, and so on. Light scattered or absorbed from the laser recorded spots and the prerecorded black spots contrasts with the surrounding field where no spots exist. The beam should deliver sufficient laser pulse energy to the surface of the recording material to create spots. Typically, 5–20 milliwatts is required, depending on the recording material. A 20 milliwatt semiconductor laser, focussed to a five micron beam size, records at temperatures of about 200° C. and is capable of creating spots in less than 25 microseconds. The wavelength of the laser should be compatible with the recording material. In the read mode, power is lowered to about 5% of the record power.

Optical contrast between a spot and surrounding field is detected by light detector 65 which may be a photodiode. Light is focussed onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to spots. These signals are processed and recorded for subsequent display as useful information regarding the transaction recorded on the card.

In operation, the card of the present invention is used to record sequentially accumulated data, as medical records, insurance records, personal information, or financial transactions. For example, it could be used just like a passbook. First the card is read to determine previously recorded information. Next, a user enters his transaction into a financial transaction or medical transaction information recorder. Such recorder then causes data to be written on the strip by means of the laser. The data could represent a transaction entry with a new account status. Operating in this mode, a user may use the card of the present invention in free standing financial transaction or medical transaction information machines in isolated locations. Prerecorded read-only memory spots may be used to program the recorder to perform a particular transaction. The laser recorded data spots then record each transaction sequentially maintaining an up-to-date record on one card.

While the data medium of the present invention has been described with reference to a data card, such a use is only a single example. The medium could also be used in data tapes, data disks and drums.

What is claimed is:

1. An optical data recording and information storage medium comprising,
    a transparent substrate and an overlying exposed and developed, high resolution emulsion layer, said emulsion layer containing prerecorded optically readable data spots, and
    a vapor deposited, optically reflective, laser recording layer disposed over said emulsion layer, said layer capable of recording laser written spots having a dimension in the range between 2 and 50 microns written at speeds of at least 1000 bits per second.

2. The medium of claim 1 disposed on a wallet-size plastic card base, said recording layer disposed proximate to said plastic card base.

3. The medium of claim 2 wherein said card base is transparent.

4. The medium of claim 1 where said prerecorded optically readable data spots are black filamentary silver.

5. The medium of claim 1 wherein said prerecorded data spots and said laser written data spots are approximately the same size.

6. The medium of claim 1 wherein said prerecorded data spots are the only data spots on said medium.

7. The medium of claim 1 wherein said prerecorded data spots are combined with laser recorded data spots on said medium.

8. A method of making an optical information storage and recording medium comprising,
    photolithographically prerecording and processing data spots on a high resolution, photosensitive medium of the type having a transparent substrate, and
    vapor depositing a reflective metal layer onto said photosensitive medium distal to the substrate.

9. The method of claim 8 further defined by recording laser written data spots onto said reflective metal layer, thereby producing prerecorded and laser written data spots in a common medium.

10. The method of claim 8 further defined by disposing said medium onto a wallet-size card base.

11. The method of claim 10 further defined by bonding a thin, dust and scratch protective transparent laminating material over the transparent substrate of said medium.

* * * * *